Dec. 13, 1938.　　M. MARASCO　　2,140,089

MOISTUREPROOFED FILM

Filed May 14, 1936

- 3 — Photographically Sensitive Layer.
- 2 — Alkyl Methacrylate Layer.
- 1 — Film Support.
- 2 — Alkyl Methacrylate Layer.
- 3 — Photographically Sensitive Layer.

- 3 — Photographically Sensitive Layer.
- 2 — Alkyl Methacrylate Layer.
- 1 — Film Support.
- 2 — Alkyl Methacrylate Layer.

INVENTOR.
Martin Marasco.
BY Lynn B. Morris
ATTORNEY

Patented Dec. 13, 1938

2,140,089

UNITED STATES PATENT OFFICE 2,140,089

MOISTUREPROOFED FILM

Martin Marasco, Parlin, N. J., assignor to Du Pont Film Manufacturing Corporation, New York, N. Y., a corporation of Delaware Application May 14, 1936, Serial No. 79,790

9 Claims. (Cl. 95—9)

This invention relates to moisture-proof films, preferably for photographic use, and one of its objects is to provide an improved moisture-resisting photosensitive film for use in cinematography and color photography. A further object is to materially reduce the tendency of such films to shrink or to cockle. More specific objects will plainly appear from the detailed description hereinafter presented.

Transparent films of a material containing a cellulose nucleus, for example cellulose esters, cellulose ethers, regenerated cellulose and more particularly cellulose acetate, are hygroscopic and expand when subjected to various processing baths. After exposure to moisture these prior films, when dried, fail to resume their original uniform state, and present wrinkled or distorted areas known in the industry as cockle. The maintenance of accurate pitch in cinematic perforations is difficult, or impossible, in cine film in which cockle and shrinkage are not controlled or prevented. Films for use in the photo-mechanic, X-ray, or other graphic arts also require the highest degree of non-shrinking and non-cockling qualities.

I have discovered that it is possible to substantially eliminate cockle and the absorption of moisture by such hygroscopic films by the novel combination therewith of moisture-proofing layers containing an alkyl methacrylate, as well as the polymers and inter-polymers of an alkyl methacrylate in combination with suitable solvents, and preferably with suitable plasticizers for the methacrylates. For example, sheets of cellulose acetate may be treated, preferably on both surfaces, with a solution of methyl methacrylate to form smooth, transparent, flexible and resilient films. A plasticizer such as di-butyl phthalate may be added to the methyl methacrylate solution to prolong the effective life of the methyl methacrylate layer and to prevent any subsequent scaling or chipping of the layer from the film support. One or both of the film surfaces may be subsequently coated with a sensitive layer, such as a gelatin layer containing silver halide or a sensitized colloid to form a photographic element.

Figure 1:
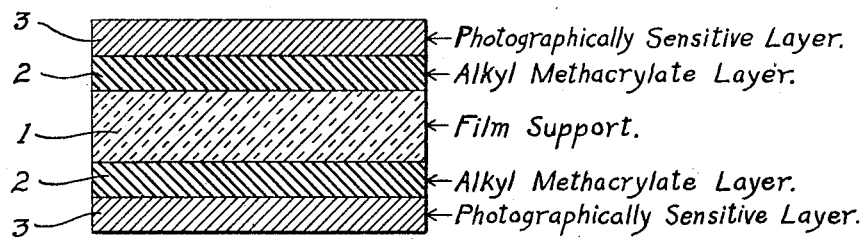
Figure 2:
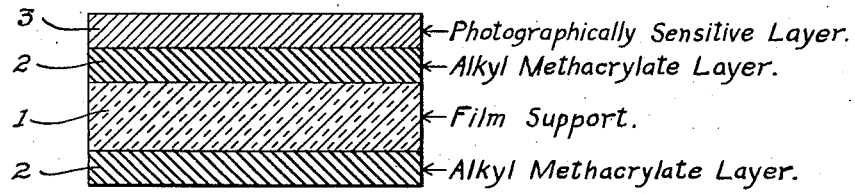

In the accompanying drawing, Fig. 1 is a diagrammatical sectional view on an exaggerated scale of film embodying one example of this invention. Fig. 2 is a diagrammatical sectional view on an exaggerated scale of another modification of this invention.

The film support or base 1 which is composed of a transparent material such as a cellulose ether or ester has coated thereon a layer 2 of a polymer of an alkyl methacrylate. Superimposed on the layer 2 is a photographically sensitive emulsion layer 3.

I have further found that a layer of an alkyl methacrylate will act as an improved protective coating to color-screen layers and line-screen layers on photographic elements or films used in color photography. In color-screen processes minute grains of dye absorbers, such as starch, are coated on a suitable adhesion layer and usually another adhesion layer is coated on the color-screen and the photographic layer coated thereon. These prior layers have been water-permeable and thus permitted various processing baths to penetrate them, with harmful effect. In line-screen color processes, where the dyes are applied in a geometrical line pattern, the prior art layer of colloid or protein coated over this line screen was found to be water-permeable and to offer little protection to the dyes from the action of subsequent baths. I have discovered that if a layer of an alkyl methacrylate, such as n-propyl methacrylate, is coated on the color or line-screen layer the color-screen is protected from the action of subsequent baths due to the moisture-proofing action of the methacrylate. The usual adhesion or anchorage layer may be applied to the methacrylate coating and a sensitive layer subsequently coated thereon. The hereindescribed methacrylate layers will also readily carry various dyes or pigments that may be required in the photographic, radiographic, or other arts to which this invention relates. One type of such dyes is described in United States Patent No. 1,973,886.

The following examples do not limit but are illustrative of preferred embodiments of my invention:

Example I.—To a solution composed of approximately 65 to 80%, by volume, of acetone and 20 to 35%, by volume, of ethyl alcohol, is added 5 to 10%, by weight, of methyl or ethyl methacrylate. To this solution is preferably added 15 to 20%, by weight, of a suitable plasticizer, such as di-butyl phthalate. A film of cellulose acetate is treated on preferably both surfaces with this solution by dipping, spraying, beading, or any of the usual coating methods. The methacrylate coating, on drying, forms a smooth, transparent, resilient and water-proof film. One or more photo-sensitive layer may be coated directly on the methacrylate layer or layers, or an adhesion layer may be first applied and the sensitive coatings subsequently applied.

Example II.—Approximately 10 to 20 grams of n-propyl-methacrylate is dissolved in approximately 250 to 300 grams of benzol. This moisture-proofing solution is preferably applied to the surface of a film of coloid or protein in any of the coating methods well known in the prior art. It is generally not necessary to add a plasticizer for the n-propyl methacrylate, but if desired, preferably 5 to 10 grams of di-butyl phthalate may be added to the above solution before coating it on the film. The above mentioned colloid, or protein films, may be in the form of separate sheets, or they may be in the form of adhesion or anchoring layers already applied to a cellulose derivative film suitable for color photography or cinematography.

*Example III.*—Approximately 10 to 20 grams of an inter-polymer of methyl methacrylate-octyl methacrylate are dissolved in 250 to 300 grams of benzol. If desired, approximately 5 to 10 grams, by weight, of di-butyl phthalate may be added if additional plasticizing action is required. This solution is applied preferably to both surfaces of a cellulose organic derivative film or foil by dipping, spraying, floating, beading or any well-known method. A photo-sensitive coating may be applied directly to the moisture-proofing layer, or an adhesion layer may be first applied thereto and one or more photo-sensitive layers subsequently coated thereon.

In the above examples, in place of acetone and ethyl alcohol other well known equivalent solvents or solvent mixtures may be used, such as suitable ketones, i. e. di-methyl and di-ethyl ketones; esters, i. e. ethyl or methyl acetate; chlorinated hydrocarbons, i. e. chloroform; and anhydrous organic acids, such as glacial acetic acid. For benzol other well known equivalents or mixtures thereof may be used, such as aromatic hydrocarbons, i. e. toluol and xylol. For di-butyl phthalate other well known equivalent plasticizers or mixtures thereof may be used, such as tri-cresyl or tri-phenyl phosphate. In applying any of these moisture-proofing solutions or their hereindescribed equivalents, the concentration of the methacrylate or mixtures thereof may be varied to suit the type of film used and the desired thickness of the moisture-proof layer. It is preferable to hold the hereindescribed moisture-proof layer to approximately 1/1000" in thickness or to keep the methacrylate content approximately 1 to 6%, by weight, of the moisture-proofed film base.

While applicant has herein described his improved moisture-proofed film in detail and with respect to preferred embodiments thereof, he does not contemplate limitation thereto, but does include all forms and modifications within the language and scope of the appended claims.

I claim:

1. In combination, a transparent film support containing cellulose acetate; a moisture-proofing coat containing a polymer of methyl methacrylate applied to both surfaces of said support; and a gelatino-silver halide emulsion applied over at least one of said moisture-proofing coats.

2. In combination, a transparent film support containing cellulose acetate; a moisture-proofing coat containing a polymer of methyl methacrylate and di-butyl phthalate applied to both surfaces of said support; and a gelatino-silver halide emulsion applied over at least one of said moisture-proofing coats.

3. In combination, a transparent film support containing cellulose acetate; a tinted moisture-proofing coat containing a polymer of methyl methacrylate and di-butyl phthalate applied to both surfaces of said support; and a gelatino-silver halide emulsion applied over at least one of said moisture-proofing coats.

4. In combination, a transparent film support containing cellulose acetate; a moisture-proofing coat composed of approximately 65 to 80%, by volume, of acetone, 20 to 35%, by volume, of ethyl alcohol, and 5 to 10%, by weight, of a polymer of methyl methacrylate applied to both surfaces of said support; and a gelatino-silver halide emulsion applied over at least one of said moisture-proofing coats.

5. In combination, a transparent film support containing cellulose acetate; a moisture-proofing coat containing an inter-polymer of methyl methacrylate-octyl methacrylate applied to both surfaces of said support; and a photo-sensitive emulsion applied over at least one of said moisture-proofing coats.

6. In combination, a transparent film support containing cellulose acetate; a moisture-proofing coat containing a polymer of methyl methacrylate and a plasticizer applied to both surfaces of said support; and a gelatino-silver halide emulsion applied over at least one of said moisture-proofing coats.

7. In combination a transparent film support containing cellulosic material taken from the group consisting of cellulose esters, cellulose ethers and regenerated cellulose; a moisture-proofing coating containing a material selected from the group consisting of the polymers and interpolymers of an alkyl methacrylate applied to both surfaces of said support, and a gelatino-silver halide emulsion applied over at least one of said moisture-proofing coats.

8. In combination a transparent film support containing cellulose acetate, a moisture-proofing coat containing a material selected from the group consisting of the polymers and interpolymers of an alkyl methacrylate applied to both surfaces of said support, and a gelatino-silver halide emulsion applied over at least one of said moisture-proofing coats.

9. In combination a transparent film support containing cellulose acetate, a moisture-proofing coat containing a polymer of ethyl methacrylate applied to both surfaces of said support and a gelatino-silver halide emulsion applied over at least one of said moisture-proofing coats.

MARTIN MARASCO.